United States Patent
Reynolds

[11] 3,783,382
[45] Jan. 1, 1974

[54] APPARATUS AND A METHOD FOR EMPLOYING SAID APPARATUS TO DETERMINE THE LOW FIELD RESISTANCE OF DC-BIASED GUNN DIODES

[75] Inventor: Allan L. Reynolds, White Plains, N.Y.

[73] Assignee: International Telephone and Telegraph Corporation, Nutley, N.J.

[22] Filed: Feb. 5, 1973

[21] Appl. No.: 329,767

[52] U.S. Cl. ............................ 324/158 D, 324/62 R
[51] Int. Cl. ...................... G01r 31/22, G01r 27/02
[58] Field of Search .................... 324/158 D, 158 T, 324/121, 62 R

[56] References Cited
UNITED STATES PATENTS

| | | | |
|---|---|---|---|
| 2,563,395 | 8/1951 | Carpentier | 324/121 R |
| 2,847,646 | 8/1958 | Marino | 324/158 D |
| 3,668,522 | 6/1972 | Ghafghaichi | 324/158 D |

Primary Examiner—Rudolph V. Rolinec
Assistant Examiner—Ernest F. Karlsen
Attorney—C. Cornell Remsen, Jr. et al.

[57] ABSTRACT

A Gunn diode is DC-biased to its operating point. A negative pulse having an amplitude equal to the bias voltage is applied across the Gunn diode. A first sinewave signal having a given frequency and a selected magnitude is applied across the Gunn diode. A voltage probe is coupled by a switch to one input of a dual-trace oscilloscope to display the waveform of the voltage across the Gunn diode on the oscilloscope. A second sinewave signal having the given frequency is applied to the other input of the dual-trace oscilloscope. The displayed waveform of the second signal is adjusted in magnitude until it is superimposed upon the first waveform on the oscilloscope. A RMS voltmeter is coupled across the second input of the oscilloscope to measure the value of the voltage of the second signal and, hence, the voltage across the Gunn diode, after the two sinewave signals are superimposed. The switch is moved to a second position so that the output of an AC current probe is coupled to the first input of the oscilloscope. The current probe converts the current through the Gunn diode to a voltage and has a known calibration or ampere to voltage conversion factor. The voltage waveform produced by the current probe is displayed on the oscilloscope and the magnitude of the second sinewave signal is adjusted until it is superimposed upon this displayed waveform. The RMS voltmeter measures the value of this second sinewave signal after these two sinewave signals are superimposed. This latter value is equal to the voltage at the output of the current probe. This latter reading of the voltmeter is multiplied by the calibration factor to provide the value of the current flowing through the Gunn diode. Then the first reading of the voltmeter is divided by the second reading of the voltmeter to determine the low field resistance of the Gunn diode.

23 Claims, 3 Drawing Figures

APPARATUS AND A METHOD FOR EMPLOYING SAID APPARATUS TO DETERMINE THE LOW FIELD RESISTANCE OF DC-BIASED GUNN DIODES

BACKGROUND OF THE INVENTION

This relates to apparatus and a method of employing the apparatus to determine the low field resistance of a DC-(direct current) biased Gunn diode.

Knowledge of the low field resistance of DC-biased Gunn diodes is of prime importance since it enables one to estimate the reliability (useful lifetime) of Gunn diodes.

In order for Gunn diodes to be used effectively, it is important that their so-called "average active-layer temperature" be limited to a value less than some arbitrarily assigned temperature. This limiting temperature depends on the nature of the particular construction of the Gunn diode, the materials comprising it, and on other considerations.

Formulas can be developed using the theoretical framework of solid-state physics which defines a relationship between the "average active-layer temperature" and a parameter characteristic of a given Gunn diode called the "low field resistance." The low field resistance derives its usefulness from the fact that it is approximately directly proportional to the average absolute temperature of the active layer of the Gunn diode.

FIG. 1 illustrates the I-V (ampere-voltage) characteristic 3 of a typical Gunn diode biased at a DC input of $V_o$ volts and $I_o$ amps. It should be noted that for terminal voltages V greater than $V_T$, the Gunn diode exhibits a negative conductance characteristic. $V_T$ is defined as the "threshold voltage" and its corresponding current $I_T$ is defined as the "threshold current."

A conventional method of determining the low field resistance of a positively biased Gunn diode involves injecting a negative voltage pulse across the diode whose amplitude is made equal to the value of the DC bias plus or minus some small voltage increment, for instance, ± 0.25 volt. This is illustrated in FIG. 1. Initially a voltage pulse of amplitude ($V_o$ − 0.25) volts is impressed across the DC-biased Gunn diode. The width of the voltage pulse is short enough to prevent appreciable cooling during the pulse. The resulting current pulse, $I_1$, is then measured by a suitably coupled AC probe coupled to an oscilloscope with the value of the current pulse $I_1$ being read from the graticule of the screen of the oscilloscope. The process is then repeated with a second voltage pulse of having a magnitude (V + 0.25) volts and the current $I_2$ is observed and measured from the graticule of the screen of the oscilloscope. The low field resistance, $R_o$, is then capable of being determined by the equation $R_o = 0.5/(I_2 - I_1)$ ohms, where the current is in amperes.

This prior art method of determining the low field resistance is well known for its lack of accuracy and reproducibility which renders it virtually useless. The primary sources of error occur in the necessity for estimating small increments ±0.25 volts of large pulse magnitudes (typically 10 to 16 volts) on an oscilloscope graticule. Thus, the measurements are (1) performed under conditions of poor resolution, (2) are dependent on the accuracy of the oscilloscope calibration and (3) are subject to any errors due to variation of the pulse's magnitude as a measurement is being made. As pointed out hereinabove, these accumulated errors generally result in grossly inaccurate values of low field resistance.

SUMMARY OF THE INVENTION

An object of the present invention is to provide apparatus and a method of employing the apparatus to determine the low field resistance of DC-biased Gunn diodes which overcomes the disadvantage of the above-mentioned prior art apparatus and method.

Another object of the present invention is to provide an improved apparatus and method of employing the apparatus that does not rely upon the accuracy of the oscilloscope or the reading of values using the graticule of the oscilloscope.

Still another object of the present invention is to provide apparatus and a method of employing apparatus which enables obtaining meaningful measurements of low field resistance of Gunn diodes having the advantage of accuracy, a high degree of reproducibility and ease of measurement which makes it well suited as a high volume production technique.

A feature of the present invention is the provision of a method for determining the low field resistance of a Gunn diode comprising the steps of direct current biasing the Gunn diode to a selected operating point; applying across the Gunn diode negative pulses having a first given amplitude and a given width; applying a first alternating current signal having a second given amplitude different than the first given amplitude and a predetermined frequency; coupling one trace input of a dual-trace oscilloscope across the Gunn diode to display a first waveform having a first value of peak-to-peak voltage equal to the value of the peak-to-peak voltage across the Gunn diode; coupling a second alternating current signal having the predetermined frequency to the other trace input of the oscilloscope to display a second waveform; adjusting the magnitude of the second waveform to superimpose the second waveform on the first waveform in the display of the oscilloscope; measuring the value of the peak-to-peak voltage of the second waveform when it is superimposed on the first waveform, the last mentioned value of peak-to-peak voltage being equal to the first value; coupling the one input of the oscilloscope to a given electrode of the Gunn diode to display a third waveform having a second value of peak-to-peak voltage related by a predetermined calibration factor to the current through the Gunn diode; adjusting the magnitude of the second waveform to superimpose the second waveform on the third waveform in the display of the oscilloscope; measuring the value of the peak-to-peak voltage value of the second waveform when it is superimposed on the third waveform, the last mentioned value of peak-to-peak voltage being equal to the second value; multiplying the second value by the calibration factor to obtain a value of the current flowing through the Gunn diode; and dividing the first value by the multiplied second value to determine the low field resistance of the Gunn diode.

Another feature of the present invention is the provision of apparatus for determining the low field resistance of a Gunn diode comprising: a first source of direct current bias coupled across the Gunn diode to bias the Gunn diode to a selected operating point; a second source of negative pulses having a first given amplitude and a given width, the second source being coupled across the Gunn diode; a third source of adjustable alternating current signals having a second given amplitude different than the first given amplitude and a predetermined frequency, the third source being coupled across the Gunn diode; a dual-trace oscilloscope having a first trace input and a second trace input; a fourth source of adjustable alternating current signals having the predetermined frequency, the fourth source being coupled to one of the first and second inputs of the oscilloscope; a voltmeter coupled across the output of the fourth source; a voltage probe coupled to one electrode of the Gunn diode; an alternating current probe coupled to the one electrode of the Gunn diode; and a switch to couple the voltage probe to the other of the first and second inputs of the oscilloscope for a first given period of time and to couple the current probe to the other of the first and second inputs of the oscilloscope for a second given period of time immediately following the first period of time.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
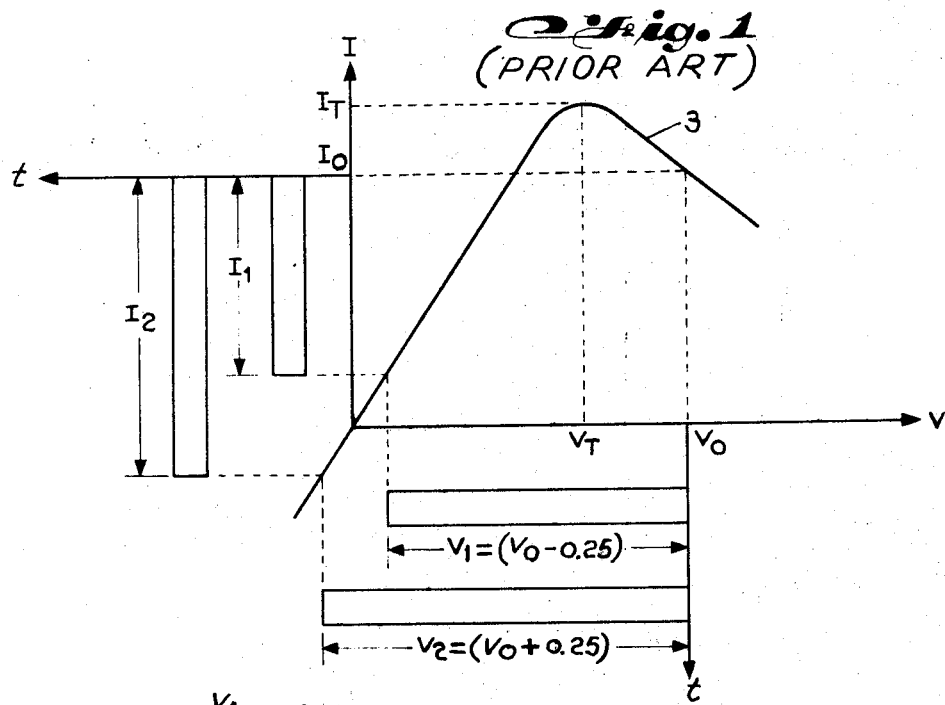
FIG. 1 is an I-V characteristic of a typical Gunn diode DC-biased to a selected operating point illustrating the technique employed in the prior art for determining the low field resistance of DC-biased Gunn diodes.
Figure 2:
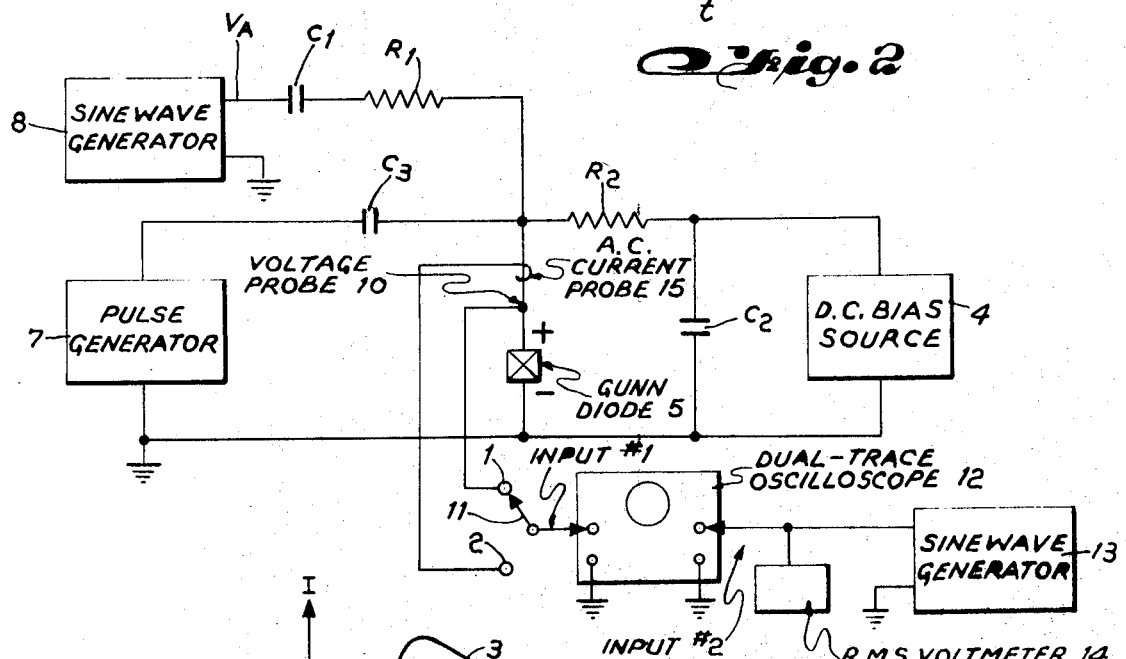
FIG. 2 is a schematic diagram, partially in block form, of apparatus for determining the low field resistance of a DC-biased Gunn diode in accordance with the principles of the present invention.

Referring to FIG. 2 there is illustrated therein apparatus in accordance with the principles of the present invention that enables determining the low field resistance of a Gunn diode. Resistors $R_1$ and $R_2$ are isolating resistors. Capacitors $C_1$ and $C_3$ are coupling capacitors and capacitor $C_2$ is a bypass capacitor.

Figure 3:
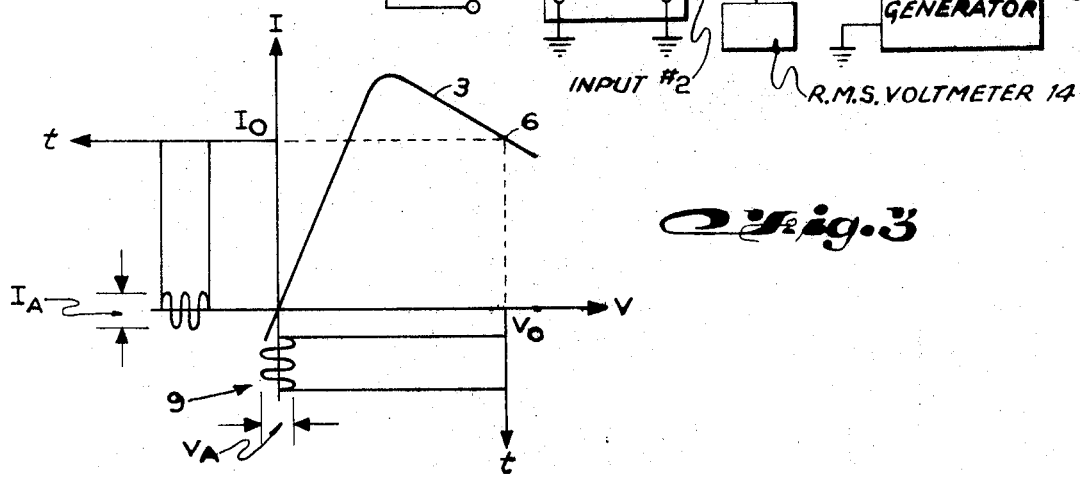
FIG. 3 is an I-V characteristic of a typical Gunn diode biased to a selected operating point illustrating the method of employing the apparatus of FIG. 2.

A DC bias voltage from DC bias source 4 is coupled across Gunn diode 5 to bias the Gunn diode to its anticipated operating point illustrated in FIG. 3 at point 6 defined by $V_o$ and $I_o$. A negative pulse having a given width and a magnitude equal to $V_o$ is supplied by generator 7 and is coupled across Gunn diode 5. The negative pulse provided by generator 7 should be capable of supplying 200–600 nanosecond width pulses at very low duty cycles to prevent diode 5 from cooling during application of the pulse from generator 7. Generator 8 provides an alternating current signal, such as a sinewave signal, having a magnitude identified as $V_A$ which is coupled through capacitor $C_1$, and resistor $R_1$ across diode 5. A lower limit is placed on the minimum frequency of the sinusoidal waveform provided by generator 5 since it is desirable that several cycles of this waveform be contained within the pulse interval as illustrated at 9 of FIG. 3.

The remainder of the components of the apparatus of FIG. 2 includes a voltage probe 10 connected to the positive electrode of diode 5. Probe 10 is connected through switch 11 when it is in contact with contact 1 to the first trace input of a dual-trace oscilloscope 12. A second alternating current signal generator 13 is coupled to the second trace input of oscilloscope 12 and a RMS (root means square) voltmeter 14 is coupled across the output of generator 13. Generator 13 is also a sinusoidal generator producing a sinewave output signal having a frequency that is identical to the frequency of the sinewave output signal of generator 8 and whose magnitude is identified as $V_B$. When switch 11 is moved into contact with contact 2 an AC current probe 15 is coupled to the positive electrode of diode 5 and to the first trace input of oscilloscope 12. Current probe 15 is a known type of current probe that has a calibration or ampere-to-voltage conversion factor wherein so many amperes of current flowing through diode 5 is converted to a unit of voltage for application to contact 2. For instance, the calibration factor may be 0.2 amperes per volt or in other words 0.2 amperes detected by probe 15 is converted to one unit of voltage by probe 15 for coupling to contact 2.

The procedure for determining the low field resistance of diode 5 is as follows:

With diode 5 DC biased at its operating point, namely $V_o$ and $I_o$, a negative pulse having a magnitude $V_o$ is injected across diode 5 by generator 7. The sinewave signal at the output of generator 8 is adjusted to a peak-to-peak voltage of $V_A$ as observed on the screen of the oscilloscope 12 with switch 11 in contact with contact 1. The magnitude of the voltage of signal generator 13 as shown on the screen of oscilloscope 12 is adjusted until it coincides in magnitude and frequency with the waveform already displayed on the oscilloscope screen. In other words the sinewave of generator 13 is superimposed upon the displayed waveform connected to contact 1 on the screen of oscilloscope 12. Thus, when the waveforms of the two inputs to oscilloscope 12 are superimposed on the screen of oscilloscope 12 voltage $V_A$ equals voltage $V_B$ and the voltage $V_B$ is accurately measured by voltmeter 14.

Next switch 11 is placed in contact with contact 2 and the voltage waveform present at the output of probe 15, which is equal to the current through diode 5 when multiplied by the calibration factor of probe 15, is applied to the first input of oscilloscope 12 and displayed on the screen thereof. The magnitude of the waveform at the output of generator 13 is adjusted until the waveform of generator 13 is superimposed upon the displayed waveform coupled to the first input of oscilloscope 12. The resultant value of voltage $V_B$ is read on voltmeter 14 and multiplied by the calibration or conversion factor of probe 15 to provide the value of current flowing through diode 5.

The low field resistance $R_o$ is then determined by solving the following equation: $R_o = V_A/I_A$, where $V_A$ is the first reading taken on voltmeter 14 when switch 10 is in contact with contact 1 and $I_A$ is the value of voltage as read on voltmeter 13 when switch 10 is in contact with contact 2 multiplied by the calibration factor of probe 15.

While I have described above the principles of my invention in connection with specific apparatus it is to be clearly understood that this description is made only by way of example and not as a limitation to the scope of my invention as set forth in the objects thereof and in the accompanying claims.

I claim:

1. A method for determining the low field resistance of a Gunn diode comprising the steps of:
   direct current biasing said Gunn diode to a selected operating point;
   applying across said Gunn diode negative pulses having a first given amplitude and a given width;
   applying a first alternating current signal having a second given amplitude different than said first given amplitude and a predetermined frequency;
   coupling one trace input of a dual-trace oscilloscope across said Gunn diode to display a first waveform having a first value of peak-to-peak voltage equal to the value of the peak-to-peak voltage across said Gunn diode;
   coupling a second alternating current signal having said predetermined frequency to the other trace input of said oscilloscope to display a second waveform;
   adjusting the magnitude of said second waveform to superimpose said second waveform on said first waveform in said display of said oscilloscope;
   measuring the value of the peak-to-peak voltage of said second waveform when it is superimposed on said first waveform, the last mentioned value of peak-to-peak voltage being equal to said first value;
   coupling said one input of said oscilloscope to a given electrode of said Gunn diode to display a third waveform having a second value of peak-to-peak voltage related by a predetermined calibration factor to the current flowing through said Gunn diode;
   adjusting the magnitude of said second waveform to superimpose said second waveform on said third waveform in said display of said oscilloscope;
   measuring the value of the peak-to-peak voltage value of said second waveform when it is superimposed on said third waveform, said last mentioned value of peak-to-peak voltage being equal to said second value;
   multiplying said second value by said calibration factor to obtain a value of the current flowing through said Gunn diode; and
   dividing said first value by said multiplied second value to determine the low field resistance of said Gunn diode.

2. A method according to claim 1, wherein said selected operating point is determined by a given direct current voltage, and
said first given amplitude is equal to said given direct current voltage.

3. A method according to claim 2, wherein said predetermined frequency is selected to provide a plurality of cycles of said first and second alternating current signals during said given width of said negative pulses.

4. A method according to claim 3, wherein said first and second alternating current signals are each sinewave signals.

5. A method according to claim 4, wherein said negative pulses are low duty cycle pulses.

6. A method according to claim 1, wherein said predetermined frequency is selected to provide a plurality of cycles of said first and second alternating current signals during said given width of said negative pulses.

7. A method according to claim 6, wherein said first and second alternating current signals are each sinewave signals.

8. A method according to claim 7, wherein said negative pulses are low duty cycle pulses.

9. A method according to claim 1, wherein said first and second alternating current signals are each sinewave signals.

10. A method according to claim 9, wherein said negative pulses are low duty cycle pulses.

11. A method according to claim 1 wherein said negative pulses are low duty cycle pulses.

12. Apparatus for determining the low field resistance of a Gunn diode comprising:
    a first source of direct current bias coupled across said Gunn diode to bias said Gunn diode to a selected operating point;
    a second source of negative pulses having a first given amplitude and a given width, said second source being coupled across said Gunn diode;
    a third source of adjustable alternating current signals having a second given amplitude different than said first given amplitude and a predetermined frequency, said third source being coupled across said Gunn diode;
    a dual-trace oscilloscope having a first trace input and a second trace input;
    a fourth source of adjustable alternating current signals having said predetermined frequency, said fourth source being coupled to one of said first and second inputs of said oscilloscope;
    a voltmeter coupled across the output of said fourth source;
    a voltage probe coupled to one electrode of said Gunn diode;
    an alternating current probe coupled to said one electrode of said Gunn diode; and
    a switch to couple said voltage probe to the other of said first and second inputs of said oscilloscope for a first given period of time and to couple said current probe to said other of said first and second inputs of said oscilloscope for a second given period of time immediately following said first period of time.

13. Apparatus according to claim 12, wherein said voltmeter is a root mean square voltmeter.

14. Apparatus according to claim 13, wherein said selected operating point is determined by a given direct current voltage delivered by said first source; and
said first given amplitude is equal to said given direct current voltage.

15. Apparatus according to claim 14, wherein said predetermined frequency is selected to provide a plurality of cycles of said first and second alternating current signals during siad given width of said negative pulses.

16. Apparatus according to claim 15, wherein said first and second alternating current signals are each sinewave signals.

17. Apparatus according to claim 16, wherein said negative pulses are low duty cycle pulses.

18. Apparatus according to claim 13, wherein said predetermined frequency is selected to provide a plurality of cycles of said first and second alternating current signals during said given width of said negative pulses.

19. Apparatus according to claim 18, wherein said first and second alternating current signals are each sinewave signals.

20. Apparatus according to claim 19, wherein said negative pulses are low duty cycle pulses.
21. Apparatus according to claim 13, wherein said first and second alternating current signals are each sinewave signals.
22. Apparatus according to claim 21, wherein said negative pulses are low duty cycle pulses.
23. Apparatus according to claim 13, wherein said negative pulses are low duty cycle pulses.

* * * * *